(12) United States Patent
Bokelman et al.

(10) Patent No.: US 8,179,573 B2
(45) Date of Patent: May 15, 2012

(54) SCANNING TWO IMAGES OF MEDIA

(75) Inventors: Kevin Bokelman, San Diego, CA (US); Glenn W. Gaarder, Ramona, CA (US); Otto K. Sievert, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2242 days.

(21) Appl. No.: 11/018,825

(22) Filed: Dec. 21, 2004

(65) Prior Publication Data

US 2006/0132854 A1  Jun. 22, 2006

(51) Int. Cl.
*H04N 1/60* (2006.01)
*H04N 1/40* (2006.01)
*H04N 1/04* (2006.01)
*G06T 5/00* (2006.01)
*G03G 15/14* (2006.01)
*G03G 15/00* (2006.01)

(52) U.S. Cl. ........ 358/474; 358/1.9; 358/3.26; 358/462; 358/3.27; 358/448; 399/371; 399/374; 399/376

(58) Field of Classification Search ............ 355/77, 355/24; 399/302; 358/474, 406, 1.9, 498, 358/401, 3.26, 527; 713/400; 101/118
See application file for complete search history.

(56) References Cited

U.S. PATENT DOCUMENTS

| | | | | |
|---|---|---|---|---|
| 4,229,100 A * | 10/1980 | Travis | | 355/77 |
| 4,261,661 A * | 4/1981 | Thiers | | 355/24 |
| 4,317,629 A * | 3/1982 | Kuseski | | 355/24 |
| 489,319 A | 1/1990 | Koshiyouji et al. | | |
| 4,990,953 A * | 2/1991 | Ibuchi | | 355/69 |
| 5,212,568 A * | 5/1993 | Graves et al. | | 358/474 |
| 5,430,536 A * | 7/1995 | Fullerton et al. | | 399/364 |
| 5,646,744 A * | 7/1997 | Knox | | 358/401 |
| 566,661 A | 9/1997 | Chuan | | |
| 567,312 A | 9/1997 | Merecki et al. | | |
| 569,660 A | 12/1997 | Cresens et al. | | |
| 589,591 A | 4/1999 | Tsai | | |
| 6,151,139 A | 11/2000 | Haded et al. | | |
| 622,962 A1 | 5/2001 | Takeuchi | | |
| 623,306 A1 | 5/2001 | Lee | | |
| 6,345,167 B1 * | 2/2002 | Bean | | 399/302 |
| 648,960 A1 | 12/2002 | Wang et al. | | |
| 6,633,990 B1 * | 10/2003 | Eisenberg | | 713/400 |
| 7,027,194 B2 * | 4/2006 | Kanda | | 358/496 |
| 7,064,863 B2 * | 6/2006 | Fukuda et al. | | 358/1.9 |
| 7,430,059 B2 * | 9/2008 | Rodrigues et al. | | 358/1.9 |
| 7,450,277 B2 * | 11/2008 | Poletto | | 358/498 |
| 2002/0071131 A1 * | 6/2002 | Nishida | | 358/1.9 |
| 2003/0002745 A1 * | 1/2003 | O'Hara et al. | | 382/254 |
| 2003/0089840 A1 | 5/2003 | Tseng et al. | | |
| 2003/0112481 A1 | 6/2003 | Wang et al. | | |
| 2004/0080791 A1 * | 4/2004 | Beck et al. | | 358/406 |
| 2005/0270601 A1 * | 12/2005 | Rodrigues et al. | | 358/527 |
| 2006/0144263 A1 * | 7/2006 | Ashikagaya | | 101/118 |
| 2006/0200529 A1 * | 9/2006 | Tonegawa | | 709/206 |
| 2007/0087283 A1 * | 4/2007 | Webster et al. | | 430/124 |
| 2007/0201105 A1 * | 8/2007 | Shoda et al. | | 358/449 |

* cited by examiner

*Primary Examiner* — King Poon
*Assistant Examiner* — Akwasi M Sarpong

(57) ABSTRACT

In one implementation, a method scans a media to provide a first image and a second image. The method further subtracts the first image from the second image.

41 Claims, 9 Drawing Sheets

*The quick red fox jumped over the lazy brown dog.*

FIG. 3

*The quick red fox jumped over the lazy brown dog.*

FIG. 4

*The quick red fox jumped over the lazy brown dog.*

FIG. 5

Now is the time for all good men to come to the aid of their party.

FIG. 6

Now is the time for all good men to come to the aid of their party.

Now is the time for all good men to come to the aid of their party.

SCANNING TWO IMAGES OF MEDIA

BACKGROUND

When scanning both sides of a double-sided or duplex media, the media may be scanned one side at a time, e.g., by manually flipping the media. The flipping typically involves additional user intervention and may result in additional delays. Also, finger prints or other undesired artifacts may be introduced by the additional media handling.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIGS. 3-8 illustrate exemplary images obtained by performing one or more of the stages of FIG. 2A, according to an embodiment.

DETAILED DESCRIPTION

Exemplary techniques for scanning both sides of a double-sided (or duplex) media utilizing a single scanning sensor are described. Some embodiments provide efficient and/or higher throughput scanning, for example, by allowing a duplex media to pass through a relatively simple paper path without flipping the media. Such implementations are envisioned to reduce maintenance costs, scanner size, delays (e.g., associated with flipping the media), and points of failure.

Duplex Scanning System

Figure 1:
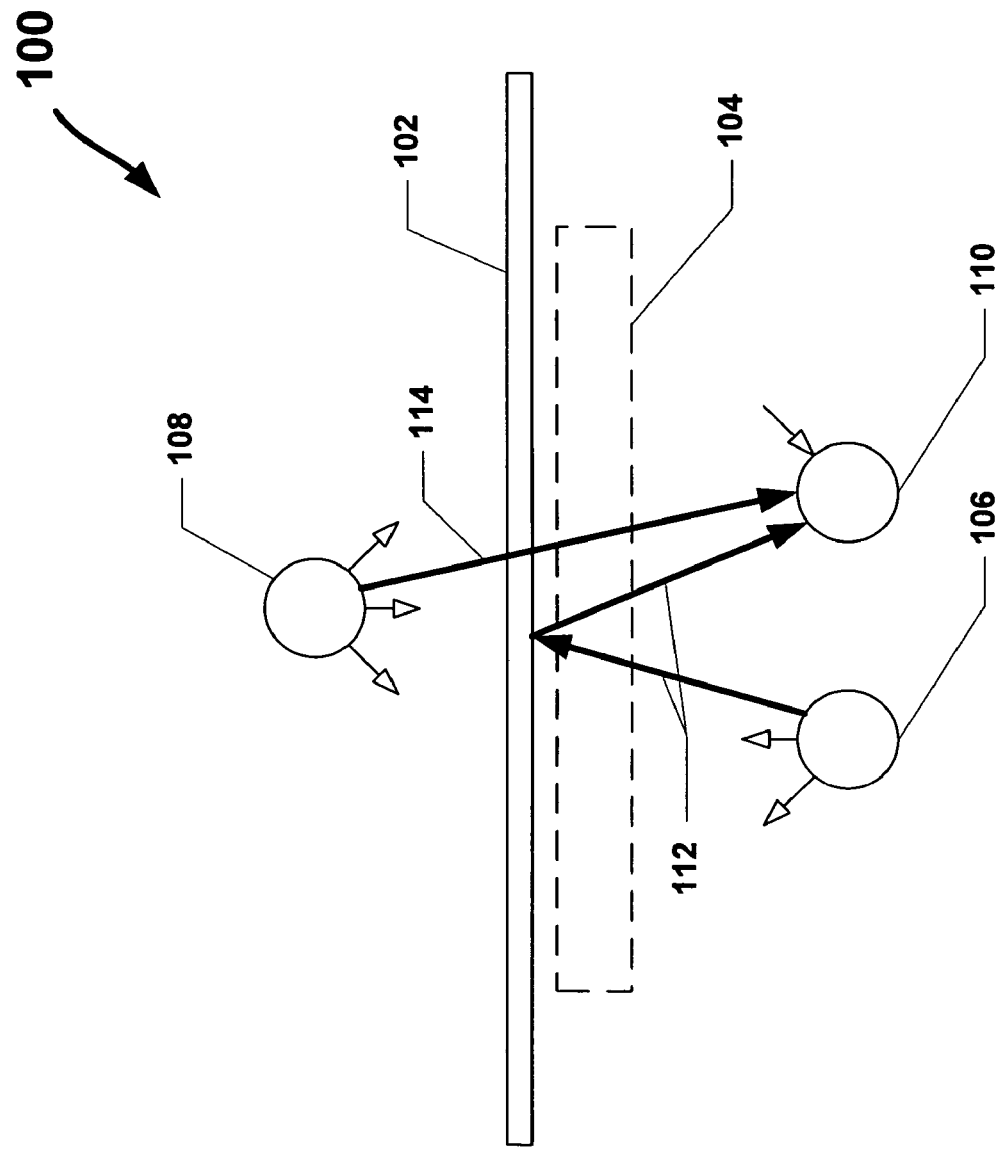
FIG. 1 illustrates an exemplary scanning system for scanning a duplex media, according to an embodiment.

FIG. 1 illustrates an exemplary scanning system 100 for scanning a duplex media. The scanning system 100 includes a duplex (double-sided) media 102 passing over an optional protective glass 104, which may serve as a platen. While FIG. 1 illustrates a horizontal scanning system, it is envisioned that the scanning system 100 may have any suitable orientation, such as vertical. The scanning system 100 may be configured as a stand-alone scanner or a multifunction device, such as a flat-bed scanner, a copier, a scanner with an automatic document feeder, an all-in-one device (e.g., providing scanning, copying, printing, and/or faxing), and the like.

The scanning system 100 also includes two sources of electromagnetic waves 106 and 108 that selectively illuminate the two sides of the duplex media 102 as will be further discussed herein. The sources 106 and 108 may be any suitable type of an electromagnetic wave source such as a light emitting diode (LED), an LED array, a halogen lamp, a high intensity discharge (HID) lamp, a Xenon lamp, a cold cathode fluorescent lamp (CCFL), a microwave energy source, and the like. Also, it is envisioned that the electromagnetic wave may emit visible light (e.g., in different colors) or invisible light. Furthermore, the intensity of the electromagnetic waves may be adjusted by varying the supply voltage and/or the distance from the target media. Also, each of the sources (106 and 108) may be strobed, selectively turned off and on, and/or left on as will be further discussed herein.

The scanning system 100 further includes a photoelectric converter 110 to convert the electromagnetic waves reflected off (112) or passed through (114) the duplex media 102 into electrical signals. The photoelectric converter 110 may be any sensor capable of converting electromagnetic waves into electrical signals such as a charge-coupled device (CCD) sensor, a complementary metal oxide semiconductor (CMOS) sensor, a contact image sensor (CIS), and the like. The electrical signals may then be processed as will be further discussed below to provide one or more images corresponding to the data (such as text or images) present on the duplex media 102. Furthermore, it is envisioned that filters may be placed between the sources (106 and 108) and the photoelectric converter 110 to control the amount of energy that is observed by the photoelectric converter 110.

Duplex Scanning

Figure 2A:
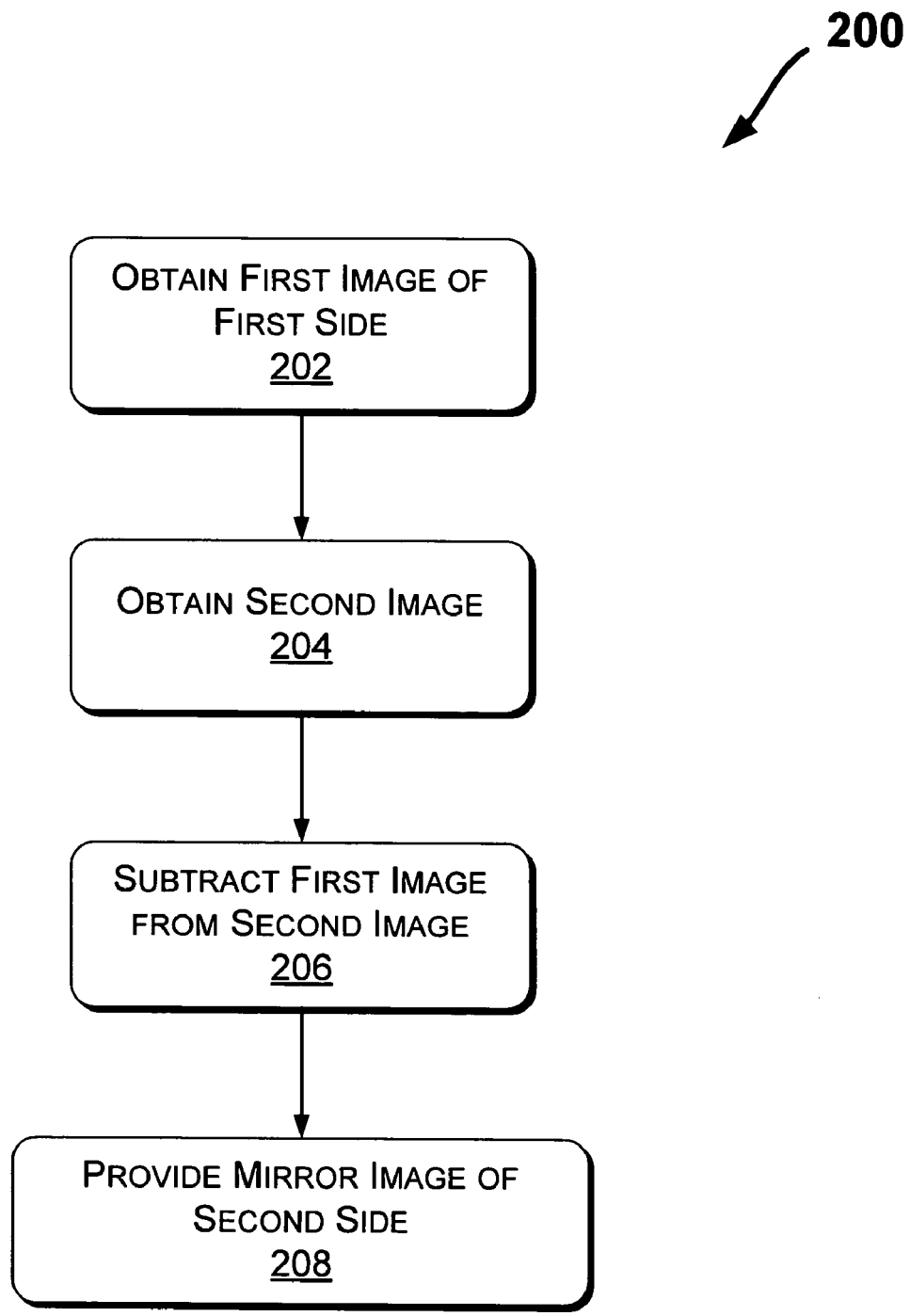
FIG. 2A illustrates an exemplary method of scanning both sides of a duplex media by scanning through the duplex media, according to an embodiment.

FIG. 2A illustrates an exemplary method 200 of scanning both sides of a duplex media by scanning through the duplex media. In one implementation, the method 200 may be applied by utilizing the scanning system 100 of FIG. 1. Hence, the method 200 may be performed by utilizing a single photoelectric converter (e.g., 110 of FIG. 1). FIGS. 3-8 illustrate exemplary images obtained by performing one or more of the stages that will be discussed with reference to FIG. 2A.

A duplex media (e.g., 102 of FIG. 1) is scanned to provide a first image (202) and a second image (204). The first image corresponds to a first side of the duplex media, e.g., the side of the duplex media 102 that faces the converter 110. The second (or composite) image corresponds to a combination image of the first side and a mirror image of a second side of the duplex media, e.g., by scanning through the duplex media 102 of FIG. 1 (114). The second side of the duplex media 102 is opposite the first side and faces away from the converter 110. It is envisioned that the order of stages 202 and 204 may be reversed.

In one implementation, the first and composite images (202 and 204) are scanned in a single pass of the duplex media. In such an implementation, two scans are performed for each scan line as follows. The first image may be obtained by turning on an electromagnetic wave source on one side of a duplex media (such as 106 of FIG. 1), while turning off a second electromagnetic wave source on an opposing side of the duplex media (e.g., 108 of FIG. 1). Accordingly, the reflection (e.g., 112) for the one side is sensed by a photoelectric converter (e.g., 110). To scan the composite image (204), the states of the two electromagnetic wave sources are reversed (e.g., 108 will be on and 106 will be off) to sense the pass through energy (e.g., 114). Accordingly, the two electromagnetic wave sources may be strobed. It is envisioned that the scanning of the first image and the composite image may occur in any order.

In a further implementation, one of the two electromagnetic wave sources may stay on during the single pass scanning, while the other electromagnetic wave source (on the opposite side of the duplex media) is strobed.

Obtaining Image of Second Side

Figure 2B:
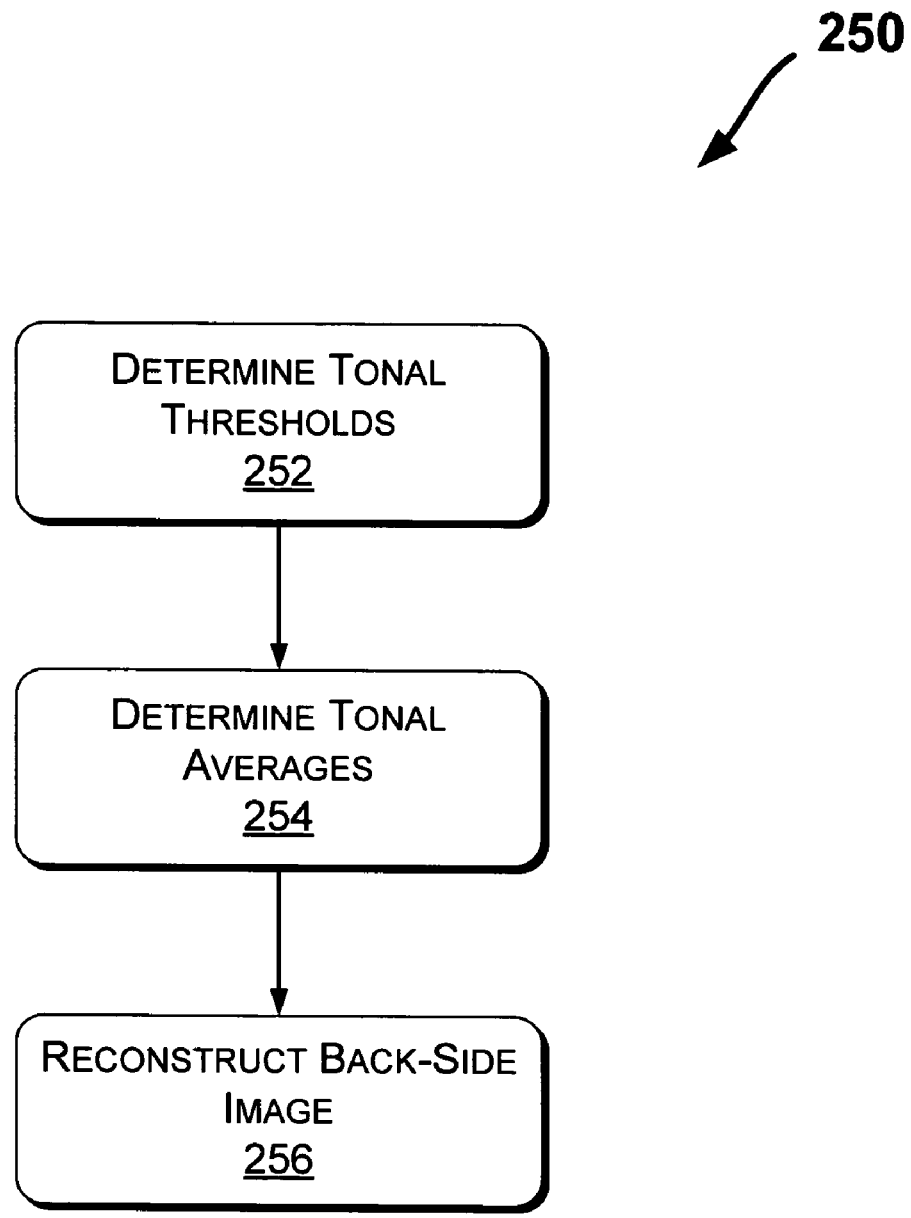
FIG. 2B illustrates an exemplary method of obtaining an image of a second (e.g., back) side of a duplex media by scanning through the duplex media, according to an embodiment.
Figure 7:
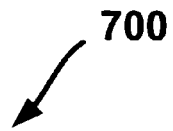

FIG. 2B illustrates an exemplary method 250 of obtaining an image of a second (e.g., back) side of a duplex media by scanning through the duplex media, according to an embodiment. In one implementation, the method 250 performs one or more stages corresponding to the stage 206 of FIG. 2A.

In an implementation, obtaining the first and second images discussed with reference to FIG. 2A (stages 202 and 204) may result in the following pixel segmentation types: (1) no content on either side of the document ("light" pixels); (2) content on only one side of the document ("gray" pixels); and (3) content on both sides of the document ("dark" pixels). This segmentation may be done tonally through the use of suitable tonal thresholds (252). In another implementation, the segmentation may be done through the use of geometric information. It is envisioned that one may use methods other than tonal thresholding to determining the pixel segmentation defined above.

In one implementation, two tonal thresholds for the three pixel types may be determined (252), including $T_{light}$ and $T_{dark}$. For example, "light" pixels may have tonal values lighter than (less than) $T_{light}$, "dark" pixels may have tonal values darker than (greater than) $T_{dark}$, and "gray" pixels may have values in between the two thresholds.

After determining the tonal thresholds (252), one or more tonal averages of the image content may be determined (254), e.g., from a reflective scan such as the first image discussed with reference to 202 of FIG. 2A. The tonal averages (254) correspond to the average tonal values of the various kinds of content present on the duplex media (e.g., 102 of FIG. 1). For black text, the average may be a single value R, but more generally the tonal average may be $R_i$ for some set of i, e.g., for the several types of content on the media.

The image of the back side of a duplex media ($I_{reconstructed}$) may then be reconstructed (256) using the following:

$$I_{reconstructed}=F\{I_{composite}-[(A/R_i)*I_{reflective}]\}$$

where:

A is an average lightness of the gray pixels in the composite image (e.g., $(T_{light}+T_{dark})/(2)$);

$A/R_i$ is a scaling factor to match tones (or densities) between the reflective image and the composite image;

$I_{composite}$ is an image from a composite scan (e.g., the second image discussed with reference to 204 of FIG. 2A);

$I_{reflective}$ is a reflective scan (e.g., the first image discussed with reference to 202 of FIG. 2A);

$R_i$ are the content averages from the reflective scan (e.g., the first image discussed with reference to 202 of FIG. 2A); and F is an operator that clips values less than zero to zero, and may adjust the final image contrast (for example, used to account for when a medium is only partially transmissive yet it is desired to have a pure white document background).

Exemplary Images

FIG. 3 illustrates an exemplary first image 300 that may be obtained by scanning the first image (202), e.g., the bottom side of the duplex media 102 of FIG. 1 through the reflection 112. FIG. 4 illustrates an exemplary image 400 that may be obtained by scanning the composite image (204), e.g., the bottom and top sides of the duplex media 102 by scanning through the duplex media 102 (114).

FIG. 5 illustrates an exemplary image 500 that is obtained by applying a filter to the first image (300 of FIG. 3), e.g., to adjust for the opacity of the duplex media (e.g., 102 of FIG. 1). The filter may be an image-dependent and/or a mask-based processing algorithm, optionally with supplementary analysis and/or enhancement logic. It is also envisioned that the first image and/or the composite image may be filtered to, for example, enhance their resolution, color, and/or contrast.

The first image (e.g., 300 of FIG. 3 or 500 of FIG. 5) is subtracted from the composite image (206) to provide a mirror image of the second side of the duplex media (208). The subtraction operation may be performed by computing components such as those discussed with reference to FIG. 12. FIG. 6 illustrates an exemplary image 600 which is obtained by subtracting the first image (e.g., 300 of FIG. 3 or 500 of FIG. 5) from the composite image (e.g., 400 of FIG. 4).

Figure 8:
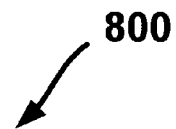

The mirror image of the second side of the duplex media (208) may optionally be darkened (see, e.g., exemplary image 700 of FIG. 7) and/or inverted to provide a second image corresponding to the second side of the duplex media (see, e.g., exemplary image 800 of FIG. 8). The darkening may precede or follow the inversion. Further, the second image may be filtered to, for example, enhance its resolution, color, and/or contrast.

Offset Duplex Scanning

Figure 9:
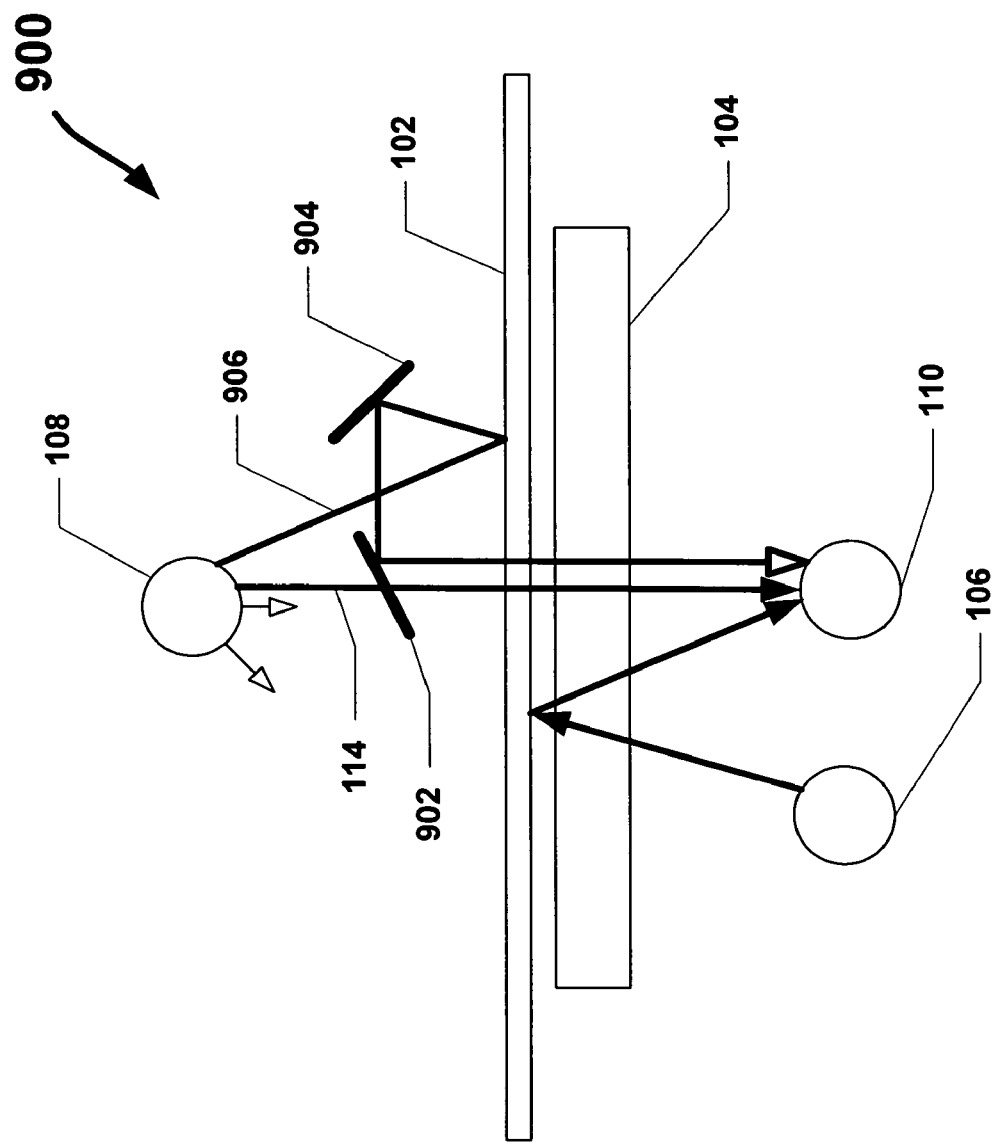
FIG. 9 illustrates an exemplary offset scanning system for scanning a duplex media, according to an embodiment.

FIG. 9 illustrates an exemplary offset scanning system 900 for scanning a duplex media. As illustrated, the system 900 includes the duplex media 102, optional protective glass 104, electromagnetic wave source 108, electromagnetic wave source 106, and the photoelectric converter 110 such as discussed with reference to FIG. 1. The system 900 further includes two mirrors 902 and 904. As illustrated, the mirror 902 may allow rays (114) to pass through. Alternatively, the mirror 902 may be physically removed from the path of these rays (114). As illustrated, the rays 906 may sequentially reflect off the duplex media 102, mirror 904, and mirror 902 prior to being sensed by the photoelectric converter 110. Accordingly, the photoelectric converter 110 is envisioned to receive two offset rays associated with each scan line of the duplex media 102. The captured image including these offset rays may be utilized to provide the composite image discussed with reference to the stage 204 of FIG. 2A.

Figure 10:
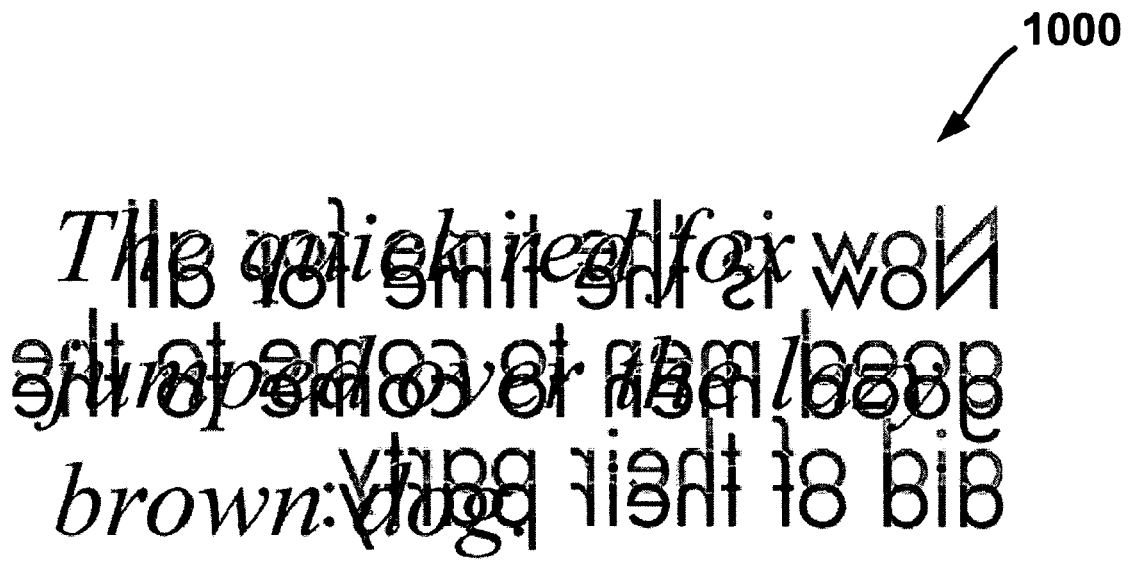
FIGS. 10 and 11 illustrate exemplary images obtained by utilizing the system of FIG. 9, according to an embodiment.
Figure 11:
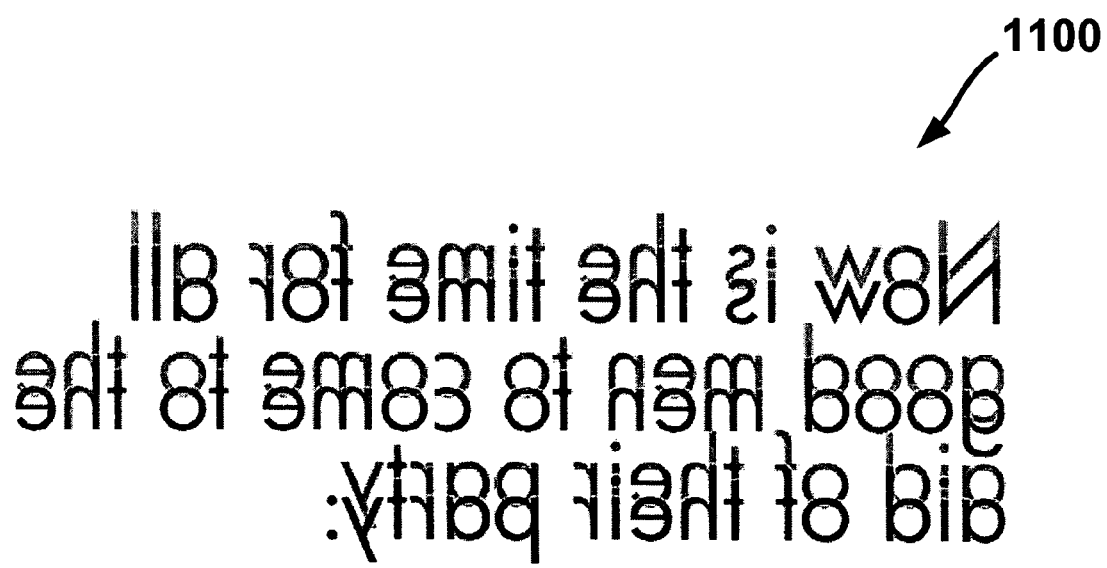

FIG. 10 illustrates an exemplary image 1000 generated by utilizing the scanning system of FIG. 9, instead of the image 400 obtained by the scanning system 100 of FIG. 1. Referring to FIG. 2A, after subtracting the first image from the composite image (206), which is now replaced by an offset composite image (e.g., 1000), the stage 208 provides an offset, mirror image of the second side of the duplex media (e.g., exemplary image 1100 of FIG. 11). Since the offset is known, pixels that repeat themselves at the specific offset may be used as a mask to reinforce the rest of the image resulting in an image such as 800 of FIG. 8. As discussed with reference to FIGS. 2-8, each of images may be filtered and manipulated to render better quality scans. It is envisioned that the offset scanning approach discussed with reference to FIGS. 9-11 may be utilized to further distinguish between the signal and present noise in the scanned composite image (e.g., 204 of FIG. 2A). Also, as discussed with reference to FIG. 2A, the offset scanning may be combined with the implementation wherein one of the two electromagnetic wave sources may stay on during the single pass scanning, while the other electromagnetic wave source (on the opposite side of the duplex media) is strobed to increase the signal to noise ratio.

Exemplary Computing Enviroment

Figure 12:
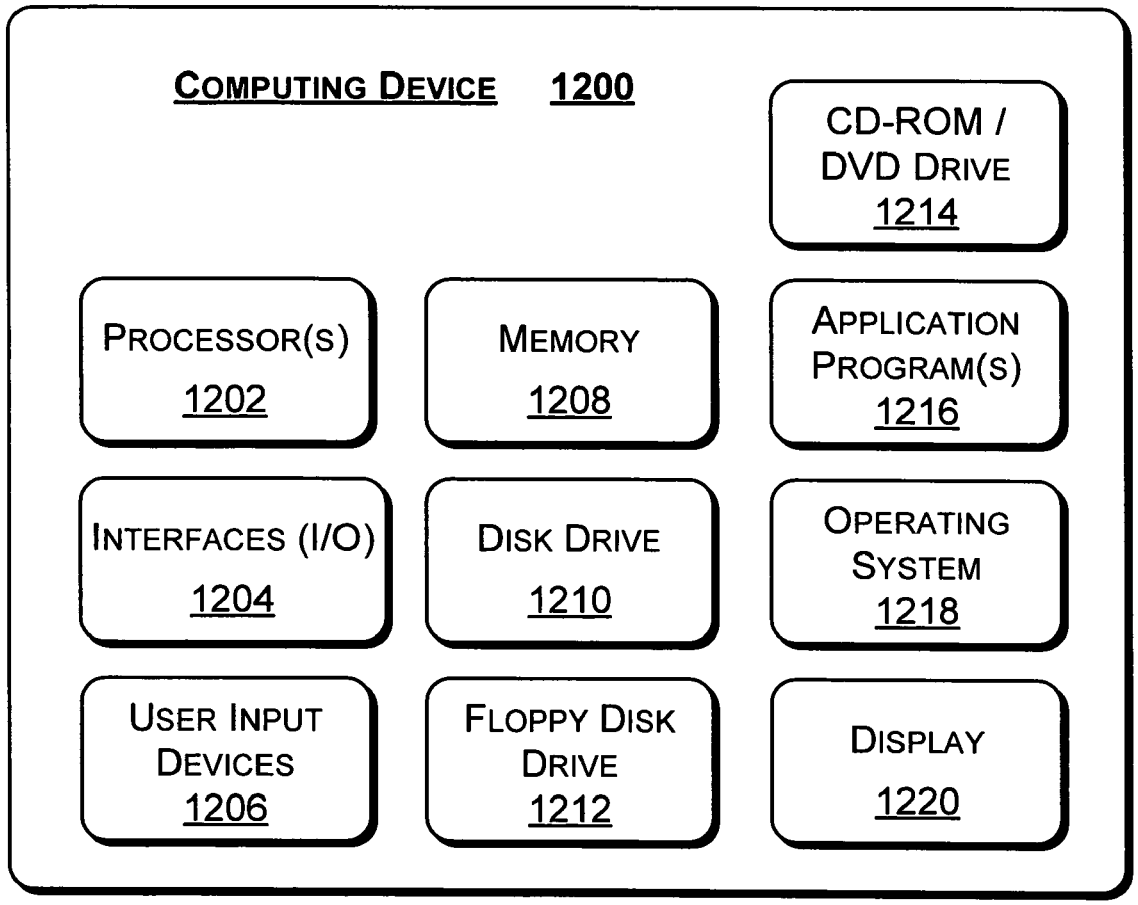
FIG. 12 illustrates various components of an exemplary computing device which may be utilized to implement portions of the techniques discussed herein, according to an embodiment.

FIG. 12 illustrates various components of an exemplary computing device 1200 which may be utilized to implement portions of the techniques discussed herein. In one implementation, the computing device 1200 can be used to perform the methods of FIGS. 2A and 2B. The computing device 1200 may also be used to provide access to and/or control of the systems 100 and 900 of FIGS. 1 and 9. The computing device 1200 may further be used to manipulate, enhance, and/or store the images discussed herein. Additionally, select portions of the computing device 1200 may be incorporated into a same device as the scanning systems 100 and 900 of FIGS. 1 and 9.

The computing device 1200 includes one or more processor(s) 1202 (e.g., microprocessors, controllers, etc.), input/output interfaces 1204 for the input and/or output of data, and user input devices 1206. The processor(s) 1202 process various instructions to control the operation of the computing device 1200, while the input/output interfaces 1204 provide a mechanism for the computing device 1200 to communicate with other electronic and computing devices.

The computing device 1200 may also include a memory 1208 (such as read-only memory (ROM) and/or random-access memory (RAM)), a disk drive 1210, a floppy disk drive 1212, and a compact disk read-only memory (CD-ROM) and/or digital video disk (DVD) drive 1214, which may provide data storage mechanisms for the computing device 1200.

The computing device 1200 also includes one or more application program(s) 1216 and an operating system 1218 which can be stored in non-volatile memory (e.g., the memory 1208) and executed on the processor(s) 1202 to provide a runtime environment in which the application program(s) 1216 can run or execute. The computing device 1200 can also include an integrated display device 1220, such as for a flat-bed scanner, a copier, a scanner with an automatic document feeder, an all-in-one device (e.g., providing scanning, copying, printing, and/or faxing), and the like.

Select implementations discussed herein (such as those discussed with reference to FIGS. 2A and 2B) may include various operations. These operations may be performed by hardware components, may be embodied in machine-executable instructions, or combinations thereof.

Moreover, some implementations may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other types of media or machine-readable media suitable for storing electronic instructions and/or data. Moreover, data discussed herein may be stored in a single database, multiple databases, or otherwise in select forms (such as in a table).

Additionally, some implementations discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one implementation" or "an implementation" means that a particular feature, structure, or characteristic described in connection with the implementation is included in at least an implementation. The appearances of the phrase "in one implementation" in various places in the specification are not necessarily all referring to the same implementation.

Thus, although embodiments have been described in language specific to structural features and/or methodological acts, it is to be understood that the claimed subject matter may not be limited to the specific features or acts described. Rather, the specific features and acts are disclosed as exemplary forms of implementing the claimed subject matter.

What is claimed is:

1. A method comprising:
    scanning a media to provide a first image and a second image, comprising:
        generating a first electromagnetic wave by a first electromagnetic source positioned closer to a first side of the media than to a second side of the media, the second side of the media opposite the first side of the media;
        reflecting the first electromagnetic wave off the first side of the media towards a photoelectric converter;
        detecting the first electromagnetic wave as reflected off the first side of the media by the photoelectric converter to obtain the first image, the first image corresponding to an image formed on the first side of the media;
        generating a second electromagnetic wave by a second electromagnetic source positioned closer to the second side of the media than to the first side of the media, such that the first and second electromagnetic sources are positioned on opposite sides of the media;
        transmitting the second electromagnetic wave through the second side of the media and then through the first side of the media, towards the photoelectric converter;
        detecting the second electromagnetic wave as transmitted through the second side of the media and then through the first side of the media to obtain the second image, the second image corresponding to a combination of an image formed on the second side of the media and the image on the first side of the media; and
    subtracting the first image from the second image.

2. The method of claim 1, wherein the media is a duplex media.

3. The method of claim 1, wherein the subtracting provides a mirror image of the image on the second side of the media.

4. The method of claim 3, further comprising inverting the mirror image of the image on the second side of the media to provide the image on the second side of the media.

5. The method of claim 4, further comprising filtering the image of the second side of the media.

6. The method of claim 1, wherein the subtracting further comprises subtracting a scaled value of the first image from the second image.

7. The method of claim 6, wherein the scaling is based on one or more items selected from a group comprising one or more tonal thresholds, one or more tonal averages, and combinations thereof.

8. The method of claim 1, wherein the scanning is performed in a single pass.

9. The method of claim 1, wherein the photoelectric converter is a single photoelectric converter, and no other photoelectric converter is used to perform the method.

10. The method of claim 1, wherein the photoelectric converter selected from a group comprising a charge-coupled device (CCD) sensor, a contact image sensor (CIS), and a complementary metal oxide semiconductor (CMOS) sensor.

11. The method of claim 1, wherein the media is illuminated by at least two sources of electromagnetic waves generating the first electromagnetic wave and the second electromagnetic wave, each of the electromagnetic wave sources being located on an opposing side of the media.

12. The method of claim 1, wherein the media is illuminated by at least two strobing sources of electromagnetic waves.

13. The method of claim 1, wherein the media is illuminated by at least two sources of electromagnetic waves, one of the two electromagnetic wave sources staying on, while a different one of the two electromagnetic wave sources is strobed.

14. The method of claim 1, wherein the media is illuminated by at least two sources of electromagnetic waves selected from a group comprising a light emitting diode (LED), an LED array, a halogen lamp, a high intensity discharge (HID) lamp, a Xenon lamp, a cold cathode fluorescent lamp (CCFL), and a microwave energy source.

15. The method of claim 1, wherein the media is illuminated by at least two sources of electromagnetic waves, wherein an intensity of electromagnetic waves emitted by the sources of electromagnetic waves is adjusted by varying an item selected from a group a comprising a supply voltage and a distance of the sources from the media.

16. The method of claim 1, wherein the scanning is performed by a device selected from a group comprising a flatbed scanner, a copier, a scanner with an automatic document feeder, and an all-in-one device.

17. The method of claim 1, wherein the second image comprises an offset image of the mirror image of the second side of the media.

18. The method of claim 1, further comprising filtering at least one of the first image and the second image.

19. An apparatus comprising:
a first and a second electromagnetic wave sources, the first electromagnetic wave source to generate a first electromagnetic wave that is to be reflected off a first side of a media, the second electromagnetic wave source to a second electromagnetic wave that is to be transmitted through a second side of the media and then through the first side of the media, the first electromagnetic wave source positioned closer to the first side of the media than to the second side of the media, the second electromagnetic wave source positioned closer to the second side of the media than to the first side of the media, such that the first and second electromagnetic sources are positioned on opposite sides of the media, the second side of the media opposite to the first side of the media; and
a photoelectric converter to capture a first image from energy of the first electromagnetic wave as reflected off the first side of the media, and a second image from energy of the second electromagnetic wave as transmitted through the second side of the media and then through the first side of the media, the first image corresponding to an image formed on the first side of the media, the second image corresponding to a combination of an image formed on the second side of the media and the image on the first side of the media,
wherein the first image is subtracted from the second image.

20. The apparatus of claim 19, wherein the photoelectric converter scans both sides of a duplex media in a single pass.

21. The apparatus of claim 19, wherein the subtraction comprises subtracting a scaled value of the first image from the second image.

22. The apparatus of claim 21, wherein the scaling is based on one or more items selected from a group comprising one or more tonal thresholds, one or more tonal averages, and combinations thereof.

23. The apparatus of claim 19, wherein the first image is subtracted from the second image to provide the mirror image of the second side of the duplex media.

24. The apparatus of claim 19, wherein the first and second electromagnetic wave sources are selected from a group comprising a light emitting diode (LED), an LED array, a halogen lamp, a high intensity discharge (HID) lamp, a Xenon lamp, a cold cathode fluorescent lamp (CCFL), and a microwave energy source.

25. The apparatus of claim 19, wherein the photoelectric converter is selected from a group comprising a charge-coupled device (CCD) sensor, a contact image sensor (CIS), and a complementary metal oxide semiconductor (CMOS) sensor.

26. The apparatus of claim 19, further comprising a first mirror to reflect offset rays reflected by a second mirror towards the photoelectric converter.

27. The apparatus of claim 26, wherein at least one of the first and second mirrors is disposed between the first electromagnetic wave source and the photoelectric converter.

28. The apparatus of claim 26, wherein the offset rays originate from the first electromagnetic wave source and reflect off of a duplex media prior to being reflected by the second mirror.

29. The apparatus of claim 26, wherein the first mirror is physically removed from a path between the photoelectric converter and the first electromagnetic wave source to permit the photoelectric converter to capture non-offset rays.

30. The apparatus of claim 26, wherein at least some non-offset rays pass through the first mirror.

31. One or more non-transitory computer-readable media having instructions stored thereon that, when executed, direct a machine to perform acts comprising:
scanning a media to provide a first image and a second image, comprising:
causing a first electromagnetic source to generate a first electromagnetic wave, the first electromagnetic source positioned closer to a first side of the media than to a second side of the media, the second side of the media opposite the first side of the media;
reflecting the first electromagnetic wave off the first side of the media towards a photoelectric converter of the machine;
detecting the first electromagnetic wave as reflected off the first side of the media by the photoelectric converter to obtain the first image, the first image corresponding to an image formed on the first side of the media;
causing a second electromagnetic source to generate a second electromagnetic wave, the second electromagnetic source positioned closer to the second side of the media than to the first side of the media, such that the first and second electromagnetic sources are positioned on opposite sides of the media;
transmitting the second electromagnetic wave through the second side of the media and then through the first side of the media, towards the photoelectric converter;
detecting the second electromagnetic wave as transmitted through the second side of the media and then through the first side of the media to obtain the second image, the second image corresponding to a combination of an image formed on the second side of the media and the image on the first side of the media; and
subtracting the first image from the second image.

32. The non-transitory computer-readable medium of claim 31, wherein the subtracting provides a mirror image of the image on the second side of the media.

33. The non-transitory computer-readable medium of claim 32, wherein the acts further comprise inverting the mirror image of the second side of the media to provide a third image corresponding to the second side of the media.

34. The non-transitory computer-readable medium of claim 33, wherein the acts further comprise filtering at least one of the first image and the third image.

35. The non-transitory computer-readable medium of claim 31, wherein the acts further comprise filtering at least one of the first image and the second image.

36. The non-transitory computer-readable medium of claim 31, wherein the subtracting further comprises subtracting a scaled value of the first image from the second image.

37. The non-transitory computer-readable medium of claim 36, wherein the scaling is based on one or more items selected from a group comprising one or more tonal thresholds, one or more tonal averages, and combinations thereof.

38. The method of claim 1, wherein subtracting the first image from the second image comprises subtracting the first image from the second image as multiplied by a scaling factor unequal to one.

39. The method of claim 38, wherein the scaling factor is adapted to match tones or densities between the first image and the second image.

40. The method of claim 39, wherein the scaling factor is a fraction having a numerator and a denominator, the numerator being an average lightness of pixels within the second image, the denominator being an average content value within the first image.

41. The method of claim 38, wherein subtracting the first image from the second image yields a value, and the method further comprises multiplying the value times an operator, the operator being adapted to one or more of adjust a contrast of the value and reduce the value to zero where the value is less than zero.

* * * * *

UNITED STATES PATENT AND TRADEMARK OFFICE
CERTIFICATE OF CORRECTION

PATENT NO.         : 8,179,573 B2
APPLICATION NO.    : 11/018825
DATED              : May 15, 2012
INVENTOR(S)        : Kevin Bokelman et al.

It is certified that error appears in the above-identified patent and that said Letters Patent is hereby corrected as shown below:

On the Title page, in Item (56), under "U.S. Patent Documents", in column 2, line 2, delete "489,319" and insert -- 4,893,196 --, therefor.

On the Title page, in Item (56), under "U.S. Patent Documents", in column 2, line 7, delete "566,661" and insert -- 5,666,611 --, therefor.

On the Title page, in Item (56), under "U.S. Patent Documents", in column 2, line 8, delete "567,312" and insert -- 5,673,125 --, therefor.

On the Title page, in Item (56), under "U.S. Patent Documents", in column 2, line 9, delete "569,660" and insert -- 5,696,609 --, therefor.

On the Title page, in Item (56), under "U.S. Patent Documents", in column 2, line 10, delete "589,591" and insert -- 5,895,914 --, therefor.

On the Title page, in Item (56), under "U.S. Patent Documents", in column 2, line 12, delete "622,962" and insert -- 6,229,628 --, therefor.

On the Title page, in Item (56), under "U.S. Patent Documents", in column 2, line 13, delete "623,306" and insert -- 6,233,065 --, therefor.

On the Title page, in Item (56), under "U.S. Patent Documents", in column 2, line 15, delete "648,960" and insert -- 6,489,602 --, therefor.

In column 7, line 16, in Claim 15, delete "group a" and insert -- group --, therefor.

Signed and Sealed this
Nineteenth Day of March, 2013

Teresa Stanek Rea
*Acting Director of the United States Patent and Trademark Office*